May 13, 1947.  J. K. HAMILTON  2,420,370
PRESSURE RELIEF VALVE
Filed Jan. 26, 1944
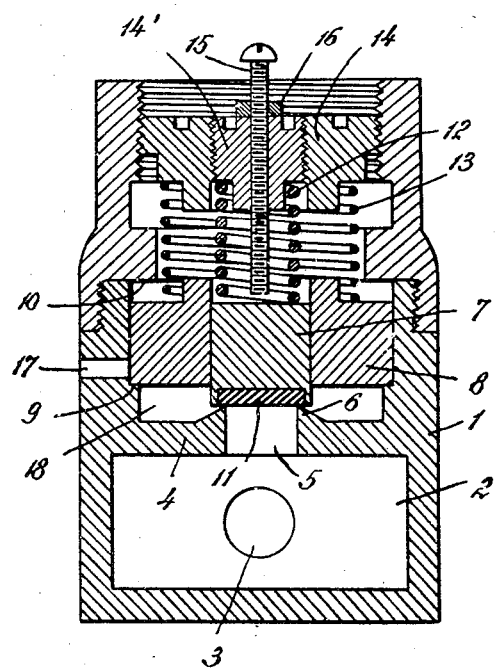
INVENTOR
James K. Hamilton
BY
ATTORNEYS Patented May 13, 1947

2,420,370

UNITED STATES PATENT OFFICE 2,420,370

PRESSURE RELIEF VALVE

James K. Hamilton, Plainfield, N. J., assignor to Air Reduction Company, Incorporated, a corporation of New York Application January 26, 1944, Serial No. 519,784

3 Claims. (Cl. 137—53)

This invention relates to improvements in pressure relief valves.

The principal object of the invention is to provide an improved relief valve for gas generators, gas containers, and similar sources of fluid under pressure, which is especially adapted for use where the normal operating pressure of the fluid is very close to the pressure at which it is desired that the valve open to full relief position.

Another object is to provide such a relief valve which will not hunt or chatter.

There are many cases where it is desirable to use a relief valve which will move to its full relief position when the fluid pressure tending to open it exceeds by only a small amount the normal operating pressure, i. e., the pressure at or near which it is desired to utilize the fluid to do some useful work or perform any desired operation. To operate satisfactorily, the valve must be tightly closed at the normal operating pressure and yet open wide upon a relatively slight increase in pressure. It is also desirable that the valve close tightly when the pressure drops to a value equal to or only slightly less than the normal operating pressure.

The simplest type of spring-loaded relief valve does not operate in such a manner that there is only a small difference between the pressure at which the valve just starts to leak (hereinafter called the leak pressure) and the pressure at which it is wide open (such pressure difference being hereinafter referred to as the operating differential) because the opening pressure acting on the valve must rise considerably before it can compress the loading spring sufficiently to allow the valve to open fully. To correct this it has been proposed to use a valve of greater area than is required in order that it need not travel so far to its fully open position, but this results in a more bulky relief valve and fails to solve the difficulty satisfactorily since a considerable pressure rise is still necessary to overcome the force of the loading spring if such force is great enough to insure a firm pressure of the valve against its seat in the closed position of the valve.

The usual way of decreasing the difference between the leak pressure and the pressure at which the valve is fully open is to make use of a so-called pop type of relief valve. In that type of valve the fluid that initially leaks past the valve when it is about to open is allowed to accumulate and its pressure is utilized to act on a portion of the valve to augment the main pressure tending to unseat the valve. However, as soon as the valve begins to move to open position the area of the escape passage for such accumulated fluid begins to increase.

According to this invention the fluid that escapes past the valve when it begins to open is accumulated and utilized to assist in further opening the valve as above described, but the escape passage for this fluid is kept closed or its area limited as much as possible until such time as the valve is wide open. Thus the force of the main pressure tending to unseat the valve is considerably augmented by the pressure of the fluid that has already passed the valve but whose escape to the atmosphere is prevented or retarded until it considerably augments the main pressure and assists in moving the valve to its fully open position. The initial leakage of fluid past the valve, and the fluid which passes the valve in the early stages of its opening movement, are therefore utilized to assist in moving the valve to its wide open position with a small operating differential. This is accomplished with a limited movement of the valve such that the annular area opened by the valve is small compared to the area of the passage which the valve controls, this being desirable as is well understood in the art.

In order for the valve to reseat at a pressure reasonably close to the leak pressure, the area of the escape passage for the above-mentioned accumulated fluid must be large enough when the relief valve is wide open to prevent such an accumulation of pressure that such pressure will tend to prevent closure of the valve until the operating pressure has dropped off considerably lower than the pressure at which it is desirable for the valve to close. With commercial tolerances, it is very difficult to produce a production relief valve that will both sufficiently limit the area of the escape passage for the accumulated fluid until after the valve has opened a substantial amount thus giving a low operating differential, and at the same time cause such area to be sufficiently large when the valve is wide open to make the valve reseat at a pressure that is close to the leak pressure. In a valve designed in accordance with the present invention both of these things are accomplished.

A valve embodying the invention is illustrated in the accompanying drawing the single figure of which represents the valve in vertical section.

The chamber 2 represents a container containing gas under pressure to which the relief valve is connected. Alternatively, it may be regarded as an inlet chamber in the valve casing itself located at the upstream side of the valve and formed below a partition 4 in the casing 1, an inlet 3 being provided to place the inlet chamber in communication with a gas generator or gas container or any other source of fluid whose pressure is to be relieved by the valve when it becomes excessive. The partition 4 has a passage or port 5 at the upper edge of which there is a raised lip or valve seat 6. The valve body is composite and made up of an inner cylindrical portion 7 constituting an inner valve member adapted to slide in an outer cylindrical portion 8 constituting an outer valve member. The outer portion 8 has a close sliding fit in the valve casing, its downward and upward movements being limited by shoulders 9 and 10 respectively on the valve casing. The lower end of the inner portion 7 of the valve body is recessed to receive a valve element 11 preferably made of semi-resilient material cemented or otherwise retained in the recess. The portion 7 of the valve body is loaded by means of a coil spring 12 which normally keeps the valve element 11 in tight enough contact with the lip 6 to prevent escape of fluid from the passage 5 when the pressure of the fluid in chamber 2 is not substantially higher than the operating pressure. The outer portion 8 of the valve body is biased downwardly by a second coil spring 13 which is lighter than the coil spring 12. The spring 13 reacts at its upper end against a sleeve 14 having threaded engagement with the valve casing 1 and the spring 12 reacts at its upper end against a plug 14' having a threaded engagement with the sleeve 14. Thus the sleeve and plug may be independently adjusted to vary the effect of the springs 12 and 13 on the inner and outer portions 7 and 8 of the valve body respectively. If desired the sleeve 14 and plug 14' may be formed in one piece to constitute a single plug threaded into the valve casing whose adjustment will vary the effect of both springs simultaneously.

The lower end of a screw 15, threaded into the plug 14', acts as a stop to limit the upward movement of the inner portion 7 of the valve body. This screw is adjustable so that the travel of the portion 7 of the valve body may be limited to the most desirable amount such that the annular area opened by the valve in its fully opened position is small compared to the cross-sectional area of the passage 5. The screw 15 may be held in adjusted position by means of a lock nut 16.

A passage 17 extending through the side wall of the valve casing leads to the atmosphere and its inner end is normally closed by the portion 8 of the valve body. Under these circumstances it is clear that up to the time that the passage 17 is opened by upward movement of the valve portion 8 any fluid which escapes past the valve element 11 and seat 6 is completely trapped and accumulated in a chamber 18 under the valve portion 8.

The operation of the valve is as follows: When the pressure in the chamber 2 rises for any reason above the operating pressure and reaches the leak pressure, the pressure acting on the under surface of the valve element 11 moves the inner member 7 of the valve body upwardly enough to produce a leak of the fluid past the lip 6 into the chamber 18. As the pressure in chamber 2 continues to rise, the pressure in chamber 18 will begin to build up as more and more fluid leaks past the lip 6 and accumulates in this chamber. As soon as the valve element 11 has moved an appreciable distance away from the lip 6 the pressure in chamber 18 will increase rapidly, there still being no escape for the fluid in this chamber to the atmosphere through the passage 17. The pressure thus built up in the chamber 18 acts on that portion of the valve member 7 which extends outwardly beyond the lip 6 and assists the pressure in chamber 2 in moving the valve member 7 to its fully open position against the end of the screw 15. When the inner valve member 7 is fully or nearly open, the outer valve member 8 will be moved upwardly by the pressure in chamber 18 until it is arrested by the shoulder 10. When the passage 17 is thereby opened the pressure in chamber 18 will drop considerably but will still be high enough to overcome the force of the spring 13. As the pressure in chamber 2 drops, the inner valve member 7 will snap to its closed position. This cuts off the supply of fluid to the chamber 18 and then the outer valve member 8 will snap down and close the passage 17. By suitably relating all of the parts the pressure at which the valve element is reseated will be very little less than the leak pressure.

A valve of the kind herein disclosed is non-chattering and does not hunt since the valve element, when it first starts to open, does not have a tendency to immediately close as is so often the case with relief valves, because the initial leakage of the fluid past the valve element is utilized to assist in moving the valve to its fully open position. Maximum use is made of the fluid which escapes past the valve during movement of the valve to open position since it is not allowed to escape to the atmosphere until the valve is nearly open or fully open thus causing its accumulated pressure to cooperate very materially in opening the valve.

I claim:

1. A relief valve for relieving fluid pressure comprising a casing, a port in a wall of the casing, a valve seat surrounding the upper end of the port, a composite valve having an inner valve member cooperating with said seat and an outer relatively movable valve member, the lower surface of the outer valve member and the upper surface of said casing wall forming upper and lower walls of a pressure chamber above said casing wall at the downstream side of the valve seat, said inner valve member having a portion adapted to be acted upon by the pressure in said pressure chamber in a direction to produce a force that assists in moving the inner valve member to open position but being free of any pressure area upon which the pressure in said chamber can act in the opposite direction to negative such force, a coil spring urging the inner valve member downwardly to normally seat the same, a coil spring urging the outer valve member downwardly, and an exhaust passage leading from said pressure chamber controlled by the vertical movement of the outer valve member, the outer valve member being so constructed and arranged as to be unaffected by the motion of the inner valve member to open position but being movable by the pressure on its lower surface of the fluid which passes the inner valve member and being adapted to maintain said exhaust passage at least partially closed during the opening movement of the inner valve member and to fully open it after the inner valve member has moved to fully open position.

2. A relief valve for relieving fluid pressure comprising a casing, a port in a wall of the casing, a valve seat surrounding the upper end of the port, a composite valve having an inner valve member cooperating with said seat and an outer relatively movable valve member, the lower surface of the outer valve member and the upper surface of said casing wall forming upper and lower walls of a pressure chamber above said casing wall at the downstream side of the valve seat, said inner valve member having a portion adapted to be acted upon by the pressure in said pressure chamber in a direction which assists in moving the inner valve member to open position, a coil spring urging the inner valve member downwardly to normally seat the same, an adjustable coil spring urging the outer valve member downwardly, a stop to limit the upward movement of the inner valve member, a stop to limit the downward movement of the outer valve member, an exhaust passage leading from said pressure chamber and normally closed by the outer valve member when it is in its lowermost position, and a stop to limit the upward movement of the outer valve member after it has fully opened said exhaust passage, the outer valve member being so constructed and arranged as to be unaffected by the motion of the inner valve member to its stop but being movable by the pressure on its lower surface of the fluid which passes the inner valve member and said spring which acts on the outer valve member being adjusted to cause the outer valve member to maintain said exhaust passage at least partially closed during the opening movement of the inner valve member and to fully open it after the inner valve member has moved to fully open position against its stop.

3. A relief valve for a gas container or the like comprising a casing enclosing a chamber having an end wall and a side wall, the end wall having a valve port therein and the side wall having an exhaust port spaced from the end wall, a primary valve element, a secondary valve element, said secondary valve element being a valve piston slidably mounted in said casing, the primary valve element being mounted in the valve piston for sliding movement toward and from said valve port independently of said valve piston, means acting on said primary valve element and urging it toward said end wall and normally holding it in position to close said valve port against the escape of gas, means independent of the means acting on the primary valve for urging the secondary valve piston element toward said end wall to a position to prevent exhaust of gas from said chamber through said exhaust port, whereby exhaust of gas from said chamber through said exhaust port can take place only after the secondary valve piston has moved away from the end wall a predetermined distance.

JAMES K. HAMILTON.

REFERENCES CITED

The following references are of record in the file of this patent:

UNITED STATES PATENTS

| Number | Name | Date |
|---|---|---|
| 1,152,733 | Houser | Sept. 7, 1915 |
| 2,162,898 | Rotter | June 20, 1939 |
| 726,355 | Schaefer | Apr. 28, 1903 |
| 537,038 | Heintzelman | Apr. 9, 1895 |
| 2,239,169 | Franck | Apr. 22, 1941 |

FOREIGN PATENTS

| Number | Country | Date |
|---|---|---|
| 8,808 | Great Britain | June 18, 1887 |
| 176,037 | Great Britain | Feb. 9, 1922 |